United States Patent [19]

Klos

[11] 4,131,319
[45] Dec. 26, 1978

[54] TRANSPORTING DEVICE AND METHOD OF TRANSPORTING

[75] Inventor: Daniel J. Klos, Franklin, Pa.

[73] Assignee: Conair, Inc., Franklin, Pa.

[21] Appl. No.: 590,457

[22] Filed: Jun. 26, 1975

[51] Int. Cl.² .................. B65G 53/24; B65G 53/42
[52] U.S. Cl. ................................................. 302/58
[58] Field of Search .................. 302/25, 57, 52, 58; 73/421 B, 425, 425.6

[56] References Cited

U.S. PATENT DOCUMENTS

| | | | |
|---|---|---|---|
| 2,419,386 | 4/1947 | Berg | 302/58 |
| 3,018,135 | 1/1962 | Reib | 302/58 |
| 3,031,233 | 4/1962 | Pendleton | 302/58 |
| 3,136,584 | 6/1964 | Whitlock | 302/52 |
| 3,416,844 | 12/1968 | Steidley | 302/58 |
| 3,436,125 | 4/1969 | Doherty et al. | 302/58 |

Primary Examiner—Evon C. Blunk
Assistant Examiner—Jeffrey V. Nase

[57] ABSTRACT

This invention relates to a bulk material unloader and more particularly to a device, such as a probe or pick-up tube, for conveying a fluidized particulate or pulverant material in an improved manner and an improved method of transporting such particulate or pulverant material.

7 Claims, 2 Drawing Figures

U.S. Patent  Dec. 26, 1978  4,131,319
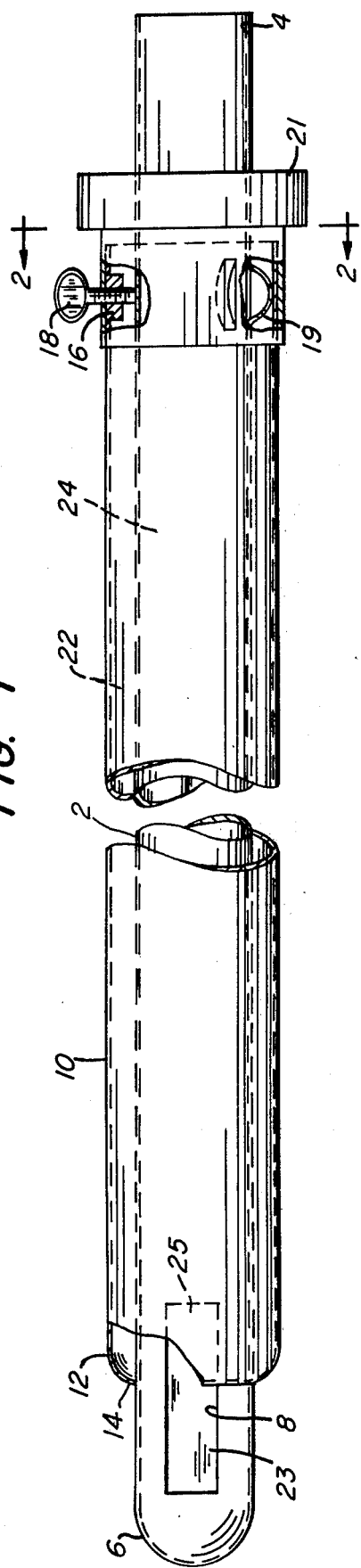

TRANSPORTING DEVICE AND METHOD OF TRANSPORTING

The use of devices such as probes or pick-up tubes is commonly used in the plastics industry to transport or convey dry bulk material, such as raw material plastics in the form of beads, granules, powder, chips and the like, from various types of containers, such as storage tanks and silos, shipping containers, in plant storage bins, railway hopper cars and the like to various places for storage or use within a plastics processing plant. Such devices are used in a wide variety of positions and environments all of which are well known in the art such that further description thereof is not necessary to one skilled in the art to which this patent application is directed. Illustrative fairly recent patents of such transporting devices are 3,031,233; 3,136,584; 3,416,844 and 3,436,125; however, earlier illustrative patents on such devices are also well known.

In use such devices are inserted within the material to be transported or located to receive the material to be transported and must permit the entrance of a sufficient amount of fluidizing medium, usually air, to permit the material to be transported to enter the device and thereafter transport or convey the material to suitable lines for discharge into suitable means as desired. In view of these requirements one object of my invention is to provide a new and improved device for transporting particulate or pulverant material.

Another object of my invention is to provide a new and improved pick-up tube device for particulate or pulverant material which is easily adjusted to obtain a desired ratio of material to air flow.

Still another object of my invention is to provide a new and improved pick-up tube device for particulate or pulverant material which has an equal area relationship in the portions of the air flow path to permit adjustment of the ratio of material to air flow.

An important object of my invention is to provide a new and improved method for transporting particulate or pulverant materials.

These and other objects and advantages of this invention will become apparent upon consideration of the following description and illustration of the preferred embodiment of my invention as of this time.

In the drawings:

FIG. 1 is a side elevational view of a transporting device constructed in accordance with the principles of my invention with portions thereof being removed to more clearly show the structure thereof;

FIG. 2 is a cross-sectional view of the device as shown in FIG. 1 taken along the line A—A thereof.

As shown in the drawings a transporting device constructed in accordance with the principles of this invention comprises an inner material transporting tube 2 having an outer open end 4 to which a suitable vacuum supply is connected in any suitable manner and an opposite inner closed end 6. An inlet opening 8 is provided in tube 2 adjacent to and axially spaced from the inner closed end 6 and is of a configuration to permit the entry and free flow of material therethrough. As shown opening 8 is desirably an elongated slot having axially spaced ends.

An outer tube 10 is positioned in radially spaced relationship around tube 2 with its inner end 12 having a radially inwardly circular portion or flange 14 which slidably engages the outer surface of the tube 2 whereby the tube 10 is axially telescopically positionable with respect to tube 2. Tube 10 is selectively positioned in fixed axial relationship with respect to tube 2 in any suitable manner such as by means of boss 16 carried by tube 10 which suitably threadedly receives a releasable thumb set screw 18 the inner end of which screw 18 firmly engages the outer surface of tube 2. Any suitable means such as radially inwardly extending detents 19 may be provided axially inwardly adjacent the outer ends of the tubes 2 and 10 to extend between the tubes 2 and 10 and slidably engage one of the tubes 2 or 10 to maintain the desired radial spacing between the tubes 2 and 10. Also, although not shown, the free edge of flange 14 may, if desired, be provided with a continuous suitable sealing means to prevent the entry of fine material between the inner edge of flange 14 and the outer surface of tube 2 into the inner end of tube 10. In use, a suitable vacuum source is connected to obtain a vacuum within the interior of tube 2 in any suitable well known manner. With such a vacuum air enters the upper open end of tube 10 between the tubes 2 and 10 and flows axially inwardly in the passageway 22 formed between the tubes 2 and 10 through the opening 8 and through the interior passageway 24 of tube 2 to the conveying line, not shown, suitably connected to the open end 4 of tube 2. If desired a suitable air filtering means 21 may be located at the outer open end of passageway 22.

For the purposes of this invention the cross-sectional area of the passageway 22 is preferably equal to the area of the opening 8 and equal to the cross-sectional area of the interior passageway 24 of tube 2. The inner free end of tube 10 is selectively axially locatable with respect to the tube 2 so that opening 8 can be located so as not to be in communication with passageway 22 or so that opening 8 is in its entirety in communication with passageway 22 or in any relative intermediate position. With the tube 10 located so that opening 8 is in its entirety in communication with the interior of tube 10 the no-load resistance to air flow throughout the pick-up device is established and accordingly the original manufacturer can properly determine the size for the vacuum pump to convey material through the device. A user is not, however, required to determine such no-load resistance to air flow since the original manufacturer will have provided or advised the user as to the proper size of vacuum pump to be used with the pick-up device.

The pick-up device can be used in various manners and for simplicity of understanding the use of the device to unload a vertical shipping drum of particulate or pulverant material will be described. In such use the device is first inserted within the material to be conveyed in a normal well known manner; however, by having a closed rounded end 6 the tube 2 is more easily inserted into the material. During such insertion it is desirable that the opening 8 not be open to the material to permit the air flow through the device to be easily established; however, aligning opening 8 to communicate between passageways 22 and 24 to initiate air flow can be done as desired. With the pick-up device vertically located within such a shipping drum and with a vacuum being applied to the passageway 24 the tube 10 is axially positioned so that a lower area 23 of opening 8 is opened to permit material from such drum to flow therethrough. As is known since the area 23 is the opening through which the material to be transported flows it is necessary that slot 8 be of a size to obtain a proper area 23 for the types of materials to be conveyed. Any increase in area 23 by outward movement of tube 10 with respect to tube 2 inherently causes a reduction in the remaining cross-sectional area 25 of opening 8. Conversely any decrease in area 23 by inward movement of tube 10 with respect to tube 2 will inherently cause an increase in the area 25. Any such increase or decrease in area 23 will cause an identical increase or decrease in area 25 — since the ends of the opening 8 are spaced axially of the tube 2 and the inner end of tube 10 is located between such ends in normal operation.

In use air will also pass through the material to be conveyed and through the area 23 of opening 8 into passageway 24 so that the total air flow in passageway 24 will be the combined air flow through the material and area 23 and the incoming direct air flow from passageway 22 through area 25. Thus by locating tube 10 with respect to tube 2 so that the total air flow through passageway 24 is the same as the direct air flow with the opening 23 closed to the material there is no danger that the vacuum pump will be overloaded. Thus, for example A, in conveying light weight pellets through which air readily flows the tube 10 is located to provide a large opening 23 with little or possibly no relatively direct air flow being necessary from passageway 22 through area 25. In handling heavier particulates, example B, when more air flow is needed than in example A to obtain the desired particulate flow the amount of relatively direct air flow through area 25 can readily be provided by repositioning tube 10 to decrease area 23 with respect to the area 23 required in example A. In handling dense materials, example C, with little air flow through the material the amount of relatively direct air flow through area 25 can readily be provided by repositioning tube 10 to decrease the area 23 with respect to the area 23 set forth in examples A and B.

Further since the opening 8 is the same area as passageway 22 an increase in relatively direct air flow through passageway 22 will cause a proportional decrease in the material entry opening 23 so that the desired air-material flow can be readily obtained by adjusting the position of tube 10 relative to tube 2. That is, both air and product are simultaneously varied in the proper manner to obtain the desired material air flow ratio. Thus, moving tube 10 to obtain more relatively direct air flow inherently reduces the material opening or increasing the material opening inherently reduces the relatively direct air flow whereby a desired material air flow ratio can be obtained.

Although the preferred embodiment has been described it is possible to provide a passageway 22 having a larger cross-sectional area than opening 8. Such increase in the area of passageway 22 is not as desirable since the tube 10 is larger than necessary which increases the weight of the pick-up device. A passageway 22 smaller than the opening 8 can also be employed; however, the air flow through passageway 22 can be adversely affected in some instances.

It is to be noted that the direct air flow through area 25 of opening 8 occurs immediately adjacent the material flow through area 23 of opening 8 so that the material being conveyed is readily entrained within the total air flow stream. Further the pick-up device is ideally suited for use in horizontal position, such as hopper car unloading, since only a single material receiving opening 8 is provided which can be rotated out of its material receiving position to discontinue material conveying. In any operating position the tube 10 can be positioned with respect to tube 2 so that the opening 8 is eliminated from the air flow path to permit easy cleaning of the pick-up device. Further the tube 2 can be rotated within tube 10 to position opening 8 as desired.

Having described a preferred embodiment of the invention in accordance with the patent statute it is to be realized that those skilled in the art may make obvious modifications to the structure described without departing from the spirit and scope of the invention. Thus, for example opening 8 may be formed by a plurality of radially spaced slots or the pick-up device may be used in a positive pressure conveying system rather than a vacuum system as described.

What is claimed is:

1. A device for use in transporting a particulate or pulverant material comprising a pair of radially spaced telescopic tubular members with the inner telescopic member thereof having a closed end with at least one axially extending passageway in the side thereof spaced axially from said closed end with one end of said passageway being adjacent to said closed end and with the outer telescopic member thereof having the end closest to said closed end in slidable engagement with the outer surface of said inner telescopic member, said pair of telescopic members being selectively axially locatable with respect to each other such that the extent of said passageway communicating therebetween is selectively variable and at least one of said tubular members having the end thereof remote from said passageway being adapted to be connected to means for providing a gaseous fluid flow through the space between said tubular members, said passageway and said inner telescopic member.

2. A device as set forth in claim 1 in which the cross-sectional area of said passageway is equal to the cross-sectional area of the interior of said inner tubular member.

3. A device as set forth in claim 1 in which the cross-sectional area of said passageway is equal to the cross-sectional area of the radial space between said pair of tubular members.

4. A device as set forth in claim 1 in which said passageway is a single axially extending slot.

5. A device as set forth in claim 4 in which the cross-sectional area of said slot equals the cross-sectional area of the interior of said inner tubular member.

6. A device as set forth in claim 4 in which the cross-sectional area of said slot equals the cross-sectional area of the radial space between said pair of tubular members.

7. A device as set forth in claim 4 in which the cross-sectional area of said slot equals the cross-sectional area of the radial space between said pair of tubular members and equals the cross-sectional area of the interior of said inner tubular member.

* * * * *